Feb. 8, 1955 W. E. KOCK 2,701,617

WAVE FILTER OF EXTENDED AREA

Filed June 23, 1950

INVENTOR
W. E. KOCK
BY
Franklin Mohr
ATTORNEY

United States Patent Office 2,701,617

Patented Feb. 8, 1955

2,701,617

WAVE FILTER OF EXTENDED AREA

Winston E. Kock, Basking Ridge, N. J., assignor to Bell Telephone Laboratories, Incorporated, New York, N. Y., a corporation of New York Application June 23, 1950, Serial No. 169,967

3 Claims. (Cl. 181—33)

This invention relates to filters for waves of various kinds and more particularly to those filter structures which are suitable for acting upon waves passing through relatively large areas in space as distinguished from structures of constricted cross-sectional area. Electromagnetic waves as well as acoustic or other compressional and elastic waves are contemplated as being adapted to be filtered by structures embodying the invention.

In many applications particularly of compressional waves of audible frequency or of frequencies either above or below audibility it is desirable to provide a filtering of certain unwanted frequencies so as to eliminate them from an admixture with the desired signal or other desired transmission. Filtering devices adapted to perform this function have usually been placed in the electrical circuit portion of a system using electrical transmission in conjunction with acoustic transmission. It is also known, however, to perform mechanical filtering of the compressional wave itself. Devices in this latter category have generally been of the nature of resonant cavities embodied in generally tubular structures of relatively restricted cross-section so that the compressional wave to be filtered must be passed through a single tube of constricted cross-section.

In accordance with the present invention a type of filtering structure is employed which can be made relatively very large in extent and may thus act upon waves passing through a space of relatively large cross-sectional area as compared with the constricted cross-section of a tubular structure.

One application of the invention is in conjunction with high fidelity radio receivers where there is a beat note, e. g. of 10-kilocycle frequency, between radio stations, which beat note appears as a whistling sound in the reproduced program and is objectionable.

While the structures disclosed herein, which are illustrative of the invention, are primarily designed for use with compressional or elastic waves, the identical or similar structures may in many cases be used with electromagnetic waves of equal or nearly equal wavelength. As the operation of the structures is believed to be dependent upon the efficient reflection of waves from the surfaces of the structures serving as elements of the filters, it will be evident that for use with compressional or elastic waves, a structure requires the necessary mechanical rigidity to reflect compressional waves from its surfaces and has no need of electrical conductivity, whereas the same or any other structure for use with electromagnetic waves requires the necessary surface conductivity to reflect electromagnetic waves effectively and requires only enough mechanical rigidity to maintain its parts in the desired positions relatively to one another.

I wish it to be understood that the embodiments of the invention shown herein are illustrative only and do not limit the kinds of structure which may be employed within the spirit and scope of the invention.

Figure 1:
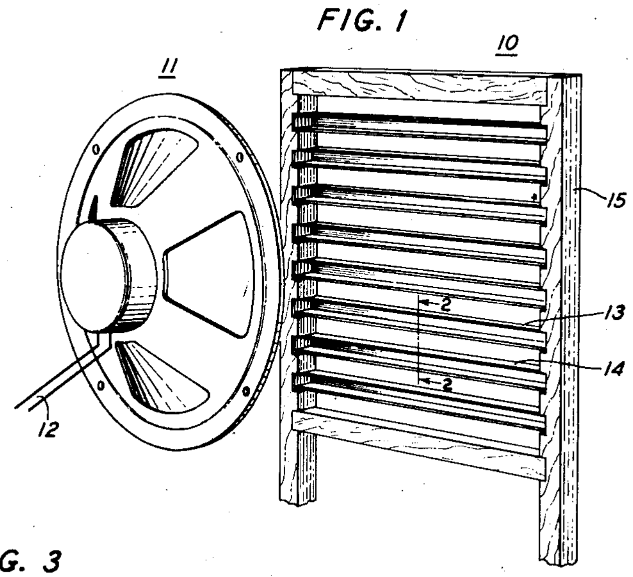
Fig. 1 is a perspective view of an embodiment of the invention in conjunction with a loudspeaking telephone receiver.

Fig. 1 shows a filter 10, in accordance with the invention, placed in proximity to a cone-type dynamic loudspeaking telephone 11, the latter having electrical input lead wires 12. The filter elements proper are in the form of rigid channel bars such as 13 and 14 rigidly mounted in a frame 15 which may be of wood or other suitable supporting material.

Figure 2:
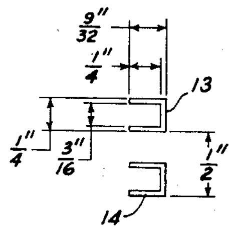
Fig. 2 is a detailed dimensional drawing of a cross-section of the structure of Fig. 1 along the line 2—2.

A filter which was built and successfully operated in suppressing a 10,000-cycle whistle caused by interference between carrier frequencies of adjacent broadcasting channels was built like the device 10 of Fig. 1, of metal channel bars of cross-sectional dimensions as shown in Fig. 2 and spaced as shown therein.

The channel bars were of metal of 1/32-inch thickness with the inner dimensions of the resonant cavity comprising 3/16-inch opening and 1/4-inch depth. The bars were spaced with 1/4 inch space between, that is, they were spaced 1/2 inch apart on centers. The number and length of the bars were sufficient to occupy an area at least as great as the area of the aperture of the loudspeaking receiver. The length and number of channels can be made as large as desired as, for example, if it is required that the structure be placed in a very large opening such as a door. The channels become resonant for waves having a wavelength equal to approximately four times the depth of the channel. When they become resonant they so react as to cause the air in their immediate vicinity to partake in the motion of air within the channel. Under these conditions, even though there might be a relatively large space between channels, the array acts like a solid sheet in so far as the reflection of waves at the critical frequency is concerned and provided that the spacing be not more than about one-half wavelength at the resonant frequency. The result is that standing waves of the resonant frequency are set up in the space between the receiver and the filter and a high impedance is imparted to the electrical circuit of the receiver due to the receiver being driven by the standing waves in phase opposition to electrical waves incoming to the receiver from the electrical circuit. On the side of the filter 10 opposite from the receiver 11 waves of the resonant frequency are not built up to any appreciable extent.

The term "rigid" as applied to the material of which the channel bar is made and as applied to the mounting of the bars means rigid in the sense that the bar when so supported in substantially invariable in shape, size and position under the application of the forces exerted by the waves to be filtered. In other words the material does not vibrate in response to the forces impressed by the wave.

The cross-sectional shape of the bar need not be rectangular but may be any shape capable of resonance at the desired frequency.

Figure 3:
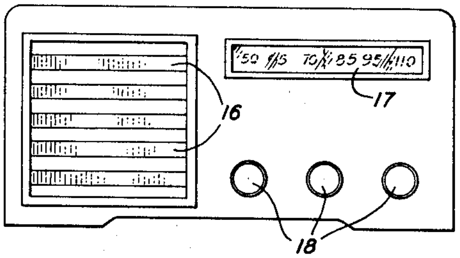
Fig. 3 is an elevational view of a radio receiver embodying the invention.

Fig. 3 shows the structure of the device 10 embodied as a grille in front of the dynamic loudspeaker in a conventional radio receiver. The back surfaces 16 of the channels 13, 14 are visible from the front of the receiver. Alternatively the channels may be covered by means of a cloth or an ornamental wooden grille or like known means. A conventional tuning scale is shown at 17 and control knobs at 18.

Figure 4:
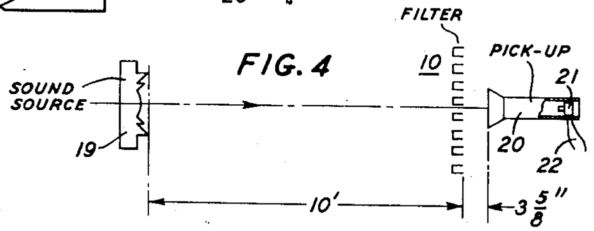
Fig. 4 is a schematic drawing of a transmission measuring system for determining the transmission vs. frequency characteristic of a filter structure as shown in Fig. 1.

Fig. 4 shows in schematic form a system useful in determining the transmission vs. frequency characteristic of a filtering device such as 10. A sound source 19, such as a loudspeaker is mounted facing the device 10 at a suitable distance, such as 10 feet. A feed horn 20 is mounted a short distance back of the device 10; in the case illustrated 3 5/8 inches. A microphone 21 is provided inside the horn 20, the microphone having electrical output leads 22.

In the operation of the system of Fig. 4, the loudspeaker is operated to emit substantially pure waves of adjustable frequency. In the case of audible frequencies the waves emitted are substantially pure acoustic tones.

The leads 22 are connected to a suitable detector. Using a succession of input frequencies, the electrical output of the microphone 21 is measured at each frequency, the horn 20 and microphone 21 together comprising a form of acoustic pick-up.

Figure 5:
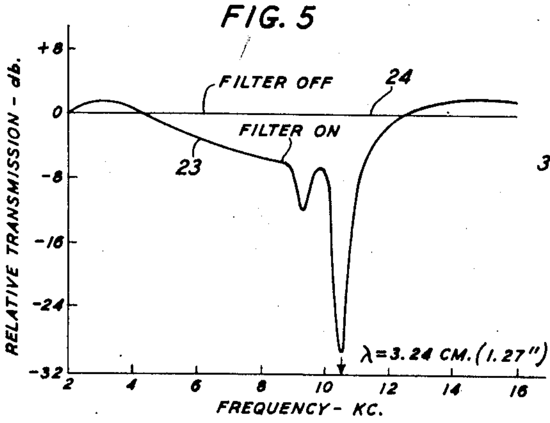
Fig. 5 is a representative transmission vs. frequency characteristic of a filter structure as determined in the measuring system of Fig. 4.

Fig. 5 shows the result of a series of transmission vs. frequency measurements made upon the device 10 as dimensioned in Fig. 2, using the system of Fig. 4 for the measurements. The observed transmission frequency characteristic is shown at 23. A comparison characteristic with the filter removed from the system is shown at 24. The curve 23 shows a pronounced minimum transmission at a wavelength of 3.24 centimeters, corresponding to a frequency of about 10,400 cycles.

From Fig. 5 it is seen that the array of channels is relatively transparent to waves of frequencies up to 10 kilocycles, relatively opaque at frequencies between 10 and 11 kilocycles, and again transparent at frequencies from 11 kilocycles up to 16 kilocycles. This property of opacity in a narrow band of frequencies is, as has been stated hereinbefore, due to the resonance of the channels in the vicinity of this frequency band. The channels need not be oriented in any particular way. They may, for example, have their channel opening faced in the direction of oncoming waves, in a direction perpendicular thereto, in a direction away from the sources of the waves, or in any other direction. Maximum reflection will occur for waves arriving in a direction perpendicular to the plane of the array. For waves arriving at an angle of incidence oblique to the plane of the array, the effective depth of the resonator will not be a quarter wavelength at the same frequency as for perpendicular incidence. However, if the channels are oriented with their openings facing perpendicularly to the general direction of arrival, for example, pointing up or down in Fig. 1 instead of toward the receiver as shown, then their transmission vs. frequency characteristic is independent of the angle of incidence of the waves.

It should be noted that an end effect may cause the resonance of the channel bars to depart from the frequency at which the channel is one-quarter wavelength deep. A correction may be made for this end effect in computing the resonant frequency. Such correction is appreciable in case the channel resonators have fairly wide openings. Reference may be made to Rayleigh's "Theory of Sound," volume 2, page 487 (Appendix A) for a discussion of the end effect. The end correction is in the nature of an increment added to the actual depth of the channel, that is, resonance is usually observed at a frequency for which the wavelength is shorter than four times the channel depth.

Figure 6:
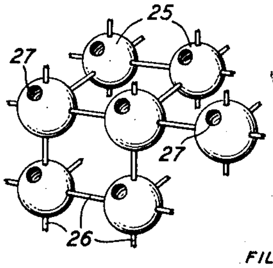
Figs. 6 and 7 are fragmentary perspective views of alternative structures embodying the invention.

Fig. 6 shows an alternative filtering structure, using a plurality of hollow spherical resonators 25 spaced apart by rigid rods 26. For use with compressional waves, each resonator should have a rigid wall and an aperture 27 for the purpose of providing access of waves to the interior of the resonator. The length of the rods should be such as to keep the spacing between resonators small as compared to the resonant wavelength. In general, all the resonators should be tuned to substantially the same resonant frequency. The resonators 25 may be arranged in a two-dimensional array or in a three-dimensional array, to fit various requirements of space and degree of filtering.

Figure 7:
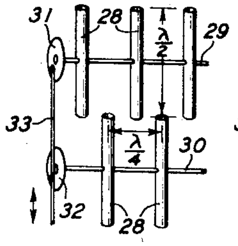

Fig. 7 shows another alternative filtering structure, using a plurality of half-wavelength cylindrical cavity resonators 28, open at both ends, spaced apart a quarter wavelength on centers and arranged in staggered rows mounted upon rods 29, 30. Any suitable means may be provided for rotating the rods 29, 30, as for example by disks 31, 32 and a push-pull rod 33. By means of the rod 33 the amount of filtering exerted by the array of cylinders 28 may be adjusted. The cylinders 28 exert no filtering action upon waves progressing in the direction of the central longitudinal axis of the cylinders and are most effective upon waves progressing perpendicularly to said axis. Each cylinder when its axis is perpendicular to the direction of wave propagation reflects waves over an effective area approximately one-half wavelength long by one-quarter wavelength wide, this area lying also perpendicular to the direction of wave propagation. As shown in Fig. 7 the array of cylinders presents effectively a solid reflecting wall to waves of the resonant frequency while allowing waves of other frequencies to pass through.

Figure 8:
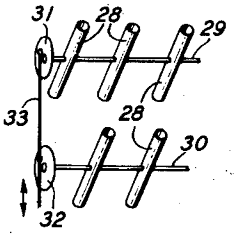
Fig. 8 shows the structure of Fig. 7 with certain elements rotated with respect to their positions as shown in Fig. 7.

Fig. 8 shows the structure of Fig. 7 with the cylindrical elements rotated with respect to their positions shown in Fig. 7. To a wave progressing in the direction perpendicular to the paper the array as shown in Fig. 8 is less effective as an absorber or reflector than the array as shown in Fig. 7. Rotation of the cylinders 28 into parallelism with the direction of wave propagation will result in substantial annulment of the filtering effect.

It may be noted that the directional polarization of the arrangement of Figs. 7 and 8 is dependent upon the fact that both ends of the cylinders are open and there is unobstructed passageway for waves from one end to the other inside the cylinder. The polarization results from the wave striking the two ends of the cylinder in the same or different phases as the case may be. If the cylinder were divided by an internal partition the directional effect would be absent and the resonator would be unpolarized as in the case of the filter 10 of Fig. 1.

The filter 10 of Fig. 1 is found to function without modification for electromagnetic waves of substantially the same wavelength, the frequency involved being however of an entirely different order of magnitude. Similarly, the structures of Figs. 6, 7 and 8 may be used without modification in the electromagnetic domain. Modified forms of the devices of Figs. 1, 6, 7 and 8 will be readily devised by those skilled in the art, as well as other and different forms within the spirit and scope of the invention.

What is claimed is:

1. A combination grille and filter for the audio output orifice of a radio receiver to suppress an audio tone generated by interference between radio waves received in said receiver from two transmitting stations, comprising a plurality of channel bars of sound reflective material, the depth of the channel being substantially equal to a quarter wavelength of the audio tone to be suppressed, said channel bars being mounted parallel to one another in a plane parallel to the plane of the orifice of the radio receiver, the channel bars being spaced apart by open spaces therebetween which are of material width not exceeding a half wavelength of the tone to be suppressed.

2. The combination according to claim 1 in which the channel bars are oriented with their open sides facing the interior of the radio receiver.

3. A narrow-band suppression filter comprising an array of linearly extended channel-shaped cavity resonators, the depth of the channel being substantially a quarter wavelength of a wave of the principal frequency which the filter is designed to suppress, and the width of the channel being materially less than one said wavelength, said resonators being mounted substantially in a single plane perpendicular to the direction of propagation of the waves to be filtered whereby narrowness of band is promoted, and the resonators being arranged in parallel relation to one another and spaced apart by material open spaces therebetween for the passage of waves not to be suppressed, but not farther apart than one-half of said wavelength to promote suppression of the said principal frequency substantially continuously over the entire array including said open spaces.

References Cited in the file of this patent

UNITED STATES PATENTS

| | | |
|---|---|---|
| 1,554,180 | Trader | Sept. 15, 1925 |
| 1,692,317 | Stewart | Nov. 20, 1928 |
| 1,816,618 | Sklar | July 28, 1931 |
| 1,910,672 | Bourne | May 23, 1933 |
| 1,969,704 | Alton | Aug. 7, 1934 |
| 1,999,919 | Truesdell | Apr. 30, 1935 |
| 2,270,416 | Cork | Jan. 20, 1942 |
| 2,299,112 | Schilling | Oct. 20, 1942 |
| 2,432,093 | Fox | Dec. 9, 1947 |
| 2,455,888 | Brown | Dec. 7, 1948 |
| 2,595,047 | Beranek | Apr. 29, 1952 |